United States Patent [19]

Horvath et al.

[11] 3,922,656
[45] Nov. 25, 1975

[54] SENSING PRESENCE OF FIRE

[75] Inventors: Zoltan Horvath, Zurich; Gustav Purt, Rapperswil, both of Switzerland

[73] Assignee: Cerberus AG, Mannedorf, Switzerland

[22] Filed: Nov. 15, 1973

[21] Appl. No.: 416,231

[30] Foreign Application Priority Data
Dec. 6, 1972 Switzerland .................. 17783/72

[52] U.S. Cl. ............. 340/237 S; 250/573; 356/207
[51] Int. Cl.² ......................................... G08B 21/00
[58] Field of Search ......... 340/237 S; 356/204, 206, 356/207; 250/552, 564, 565, 573, 575

[56] References Cited
UNITED STATES PATENTS

| | | | |
|---|---|---|---|
| 3,376,425 | 4/1968 | Kraus et al. | 340/237 S X |
| 3,409,885 | 11/1968 | Hall | 340/237 S |
| 3,534,351 | 10/1970 | Harnden, Jr. et al. | 340/237 S |
| 3,677,652 | 7/1972 | Little | 356/206 X |

FOREIGN PATENTS OR APPLICATIONS

| | | | |
|---|---|---|---|
| 594,721 | 3/1960 | Canada | 340/239 S |
| 1,086,870 | 10/1967 | United Kingdom | 340/237 S |

Primary Examiner—John W. Caldwell
Assistant Examiner—Daniel Myer
Attorney, Agent, or Firm—Flynn & Frishauf

[57] ABSTRACT

Both the spectral absorption characteristic of air to test for gaseous combustion products, and the dispersion characteristics of atmosphere, to test for particulate matter, aerosols, smoke, and the like therein, are analyzed, and if there is coincidence of presence of carbon monoxide, and/or carbon dioxide, as well as dispersion of light, an alarm signal is generated. The light source is preferably a light emitting diode, such as a tri-metal laser diode so that the radiation is in the spectral region in which absorption bands of gaseous combustion products can be sensed. The same light source may be utilized to also illuminate the atmosphere to test for particulate matter.

18 Claims, 1 Drawing Figure

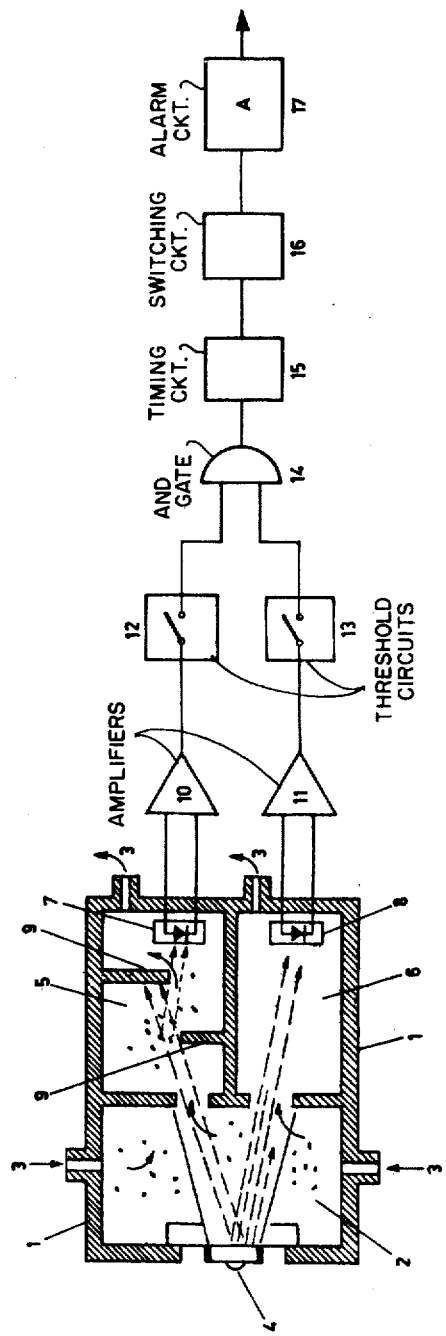

SENSING PRESENCE OF FIRE

The present invention relates to a method to sense the presence of fire, and to a fire sensor which operates by carrying out the method, and more particularly to sensing fire by utilizing photo-electric devices which are irradiated, the radiation penetrating through atmosphere samples. Upon presence of combustion products, the output of the photo-electric sensors changes.

It has previously been proposed to test for the presence of smoke or combustion gases by sensing change in electrical parameters of a photo-electric element which is irradiated by radiation passing through a sample of the atmosphere in which the combustion products may be present. Typical photo-electric elements are photo cells, photo resistors, photo diodes and the like; radiation is directed to these photo-electric elements or transducers, which may be visible light, infra-red or ultraviolet radiation, or radiation of even different wave lengths. The presence of combustion products is sensed by utilizing either absorption of radiation in atmosphere in which smoke is present, or by testing for dispersion if the photo-electric element is outside of the direct path of radiation. The irradiation of the photo-electric element then increases due to Tyndall dispersion due to particles or aerosols in the atmosphere.

Apparatus as previously proposed are subject to giving false alarms since, if they are sensitive, they can be relatively easily deceived by changes in irradiation which have causes which are not derived from the presence of a fire. For example, extraneous light may penetrate into a sensing chamber, the irradiation of the photo-electric element may change due to changes in intensity of output of the radiation source, changes in the reflection of radiation at the walls of the measuring chamber due to dust, deposition of coatings of foreign substances, and the like. Known fire sensors further do not react highly selectively to combustion products; false alarms can be derived from the sensor even by suspended particles which are not derived from a fire, for example dust, welding vapors, water vapors, and the like.

Fire sensors must operate effectively, to positively give an alarm if the fire is sensed; likewise, however, they must be highly selective and not give an alarm if no fire is present; in other words, therefore, the fire sensor must respond only to fire conditions and not to other extraneous influences.

It is an object of the present invention to provide a method to sense fires, and a fire sensor which is reliable in operation, rejects false alarms, is practically trouble-free and responds, selectively, only to combustion products.

SUBJECT MATTER OF THE PRESENT INVENTION

Briefly, two characteristics of a fire are used and an alarm is given only if both criteria are met. One of the criteria is the spectral absorption band which will arise if gaseous combustion products are present; the other is dispersion of radiation due to suspended particles resulting from combustion products. A signal will be given if, and only if simultaneously the spectral absorption characteristics of combustion products as well as dispersed radiation is indicated.

Two different criteria of fire are used. Upon combustion of organic materials, gaseous combustion products such as carbon monoxide, carbon dioxide, and water vapor result. These gases have highly defined spectral absorption bands in specific spectral ranges, particularly in the infra-red range. Fire, additionally, causes solid and liquid combustion products, which are visible in the form of smoke. They can be proved by testing for Tyndall dispersion of light, or radiation which is in wave length close to light. Simultaneous indication of gaseous combustion products, by testing for spectral absorption range, and of solid particulate matter thus provides an apparatus, and a method which are highly selective for combustion products only and which effectively reject other, stray parameters, such as dust particles, water vapor, and the like. False alarms are thus effectively avoided. The influence of stray radiation on response of the sensor may also be essentially eliminated.

To test for spectral absorption, radiation in narrow ranges is preferably utilized. These ranges are selected to be within the high absorption bands of predetermined combustion products. Typical spectral ranges are those which include the characteristic absorption bands of carbon monoxide (about 4.7 $\mu$), and carbon dioxide (at 1.46 $\mu$; 1.6 $\mu$; 2.7 $\mu$; or 4.27 $\mu$). This substantially increases the selectivity when measuring the spectral absorption, with respect to combustion products. The spectral ranges above referred to have very low or no absorption by water vapor, which further substantially increases the selectivity of testing for combustion products only. Water vapor results from many different processes independent of combustion.

In accordance with the present invention, the fire sensor includes a measuring chamber in which two photo-electric devices are provided, so arranged that one of them is subjected to direct radiation which decreases due to absorption of gaseous combustion products in predetermined spectral ranges. The other sensor is so arranged that it is beyond direct radiation from the source, so that illumination of the second sensor can be obtained only by dispersion of radiation penetrating into the chamber, thus testing for combustion products in form of dispersed particles. An electrical circuit is provided which generates an output or alarm signal if, and only if the directly irradiated photo-electric device senses decrease of radiation due to absorption and, simultaneously, the not directly radiated device indicates an increase in irradiation due to dispersion. Thus, gaseous combustion products are sensed by their absorption characteristics and, further, particulate matters are sensed by the dispersion of irradiation which is caused by their presence. The same source of radiation may be used for both sensors, or separate radiation sources can be provided.

False alarms due to extraneous disturbances are practically avoided. For example, stray light, or stray radiation which is introduced into the measuring chambers simultaneously influences both photo-electric elements in the same direction, so that no alarm will result. Stray radiation which would provide a signal at the detector for dispersed radiation, tending towards an alarm, would provide a signal to the detector for the absorption radiation in the opposite direction. Variations in intensity of radiation, due to changes in the radiation source are similarly compensated. This is also the case if two different radiation sources are used if for example, the current supply for both radiation sources changes in the same sense. It is preferred to utilize a single radiation source for both radiation detectors.

The radiation source preferably is an injection laser, or other semiconductor laser, or light emitting diode (LED). Such devices permit particularly good utilization of energy to be radiated, since the radiation source has clearly defined directional characteristics. The forwardly directed radiation is preferably used. The range of size of particulate matter to be indicated in an atmosphere sample, as a combustion product, can be further expanded by using, directly, light from such light sources. It is also possible to adjust the spectral range of radiation derived from these light sources to be in a desired, and particularly effective region.

The invention will be described by way of example with reference to the accompanying drawing, wherein the single FIGURE is a schematic diagram of the radiation sensor, and system, in accordance with the present invention, and further illustrates the method of sensing fire.

A measuring chamber 2 is formed by a housing 1. The measuring chamber 2 has openings 3 through which air, and atmosphere to be supervised can penetrate into the measuring chamber 2. The measuring chamber wall can also be formed to be partially air-permeable, arranged, however, to block out stray light. A radiation source 4, for example a laser diode or LED, is located in one wall of the radiation chamber 2. The light source directs its radiation into the interior of the measuring chamber 2. As shown, a single light source is used, although separate light sources can be used for the separate photo-electric elements. The radiation from the light source is directed into two auxiliary chambers 5, 6. The radiation is preferably beamed, or given a directional characteristic, either by optical elements, or due to the inherent construction of the light source. The auxiliary chambers 5, 6 each have a photo-electric element 7, 8, located therein, respectively. The photo-electric element or photo-electric transducer may be a photo diode, a photo cell, a photo resistor, or some other suitable photo-electric transducer. The spectral sensitivity of the photo-electric element is preferably matched to the spectral range of the radiation emitted from source 4.

Auxiliary chamber 5 is sub-divided by means of optical diaphragms or blocking baffles 9 so that direct radiation from source 4 cannot fall on photo-electric element 7. Particulate, dispersed matter in the atmosphere in chamber 5 will cause dispersion of the radiation introduced therein. If, for example, smoke or fire aerosols are present in chamber 5, stray light will be applied to photo-element 7. Upon presence of smoke or fire aerosols, photo element 7 receives an increase of radiation due to dispersion. Preferably, the photo element 7 is so designed and so arranged that it is exposed to forwardly directed radiation impinging directly thereon. This increases the sensitivity of the photo-electric element and furthermore increases the range, particularly towards the smaller sizes, of particles in the atmosphere, which can be indicated by dispersal of radiation.

The photo element 8 in auxiliary chamber 6 is so arranged that it is subjected to direct radiation from source 4. If smoke or combustion gases are introduced into the chamber 2, so that they also fall into chamber 6, radiation impinging on photo-element 8 is decreased by absorption, or diffraction or deflection, due to dispersion.

The outputs of the two photo elements 7, 8 are connected, each, to a respective amplifier 10, 11. The outputs of the amplifiers 10, 11 are connected to respective threshold detectors 12, 13. The threshold detectors are so designed that threshold detector 12 provides a signal when the radiation impinging on photo element 7 exceeds a predetermined threshold level. The threshold detector 13, however, provides a signal when the radiation impinging on photo element 8 drops below a certain predetermined value.

The output signals of the two threshold detectors 12, 13 are applied to a conjunctive gate (such as an AND-gate) 14. AND-gate 14 provides an output signal only if, simultaneously, both threshold detectors 12, 13 provide a signal. The output signal from the AND-gate 14 is applied to a timing circuit 15, which is connected to a switching circuit 16 which provides an alarm signal to energize an alarm device 17 only if the duration of the output signal of AND-gate 14 exceeds a predetermined time period.

Operation: Combustion products, such as smoke or combustion gases penetrate through opening 3 in wall 1 into measuring chamber 2 and then into auxiliary chambers 5, 6. Radiation from source 4 and falling on photo element 8 thus is decreased in intensity. The normally darkened photo element 7, however, will receive some light due to dispersion of radiation penetrating into chamber 5 which is dispersed by the particulate matter in the atmosphere therein. The radiation applied to photo element 7 thus will increase. The two photo elements 7, 8 are connected by the AND-gate 14 in coincidence, and in this case, simultaneous decrease of radiation on photo element 8 and increase of radiation on photo element 7 will provide an alarm signal.

Disturbances not due to a fire will not, however, generate an alarm signal. Variations in radiation intensity of the source 4 are preferably eliminated by irradiating both elements 7, 8 from the same source; this further decreases manufacturing costs. If the radiation intensity of source 4 changes, then radiation of both photo elements 7 and 8 will change in the same sense. Since the threshold detectors 12, 13 are connected differentially, however, the AND-gate will not provide an output signal. Variable stray radiation, penetrating through opening 3 to the wall of the chamber, or otherwise, would likewise cause a similar effect. The radiation on both photo cells 7, 8 will change in the same sense. If the inner wall of the measuring chamber becomes dirty or contaminated, typically by dust deposition (which is almost unavoidable) so that the reflective characteristic of the inner wall changes, the same result would obtain, and no alarm signal would be generated thereby. If two radiation sources are used, they are preferably supplied from the same current source, so that changes in intensity will, likewise, be in the same direction.

Rejection of false alarms can be particularly reliably obtained if the radiation source 4 is constructed to be a special injection or semiconductor laser, or an LED. The radiation derived from source 4 can then be placed into a spectral range in which combustion gases such as carbon monoxide and carbon dioxide show particularly high absorption. Decrease of radiation impinging on photo element 8 will then be selectively obtained by absorption from gases which are specific to combustion; radiation impinging on photo element 7, however, will be specifically obtained by smoke or fire aerosols. An alarm signal will then be provided when simultaneously two different criteria are utilized, namely simultaneous smoke and gaseous combustion products, present in the measuring chamber. Other substances such as dust would only cause dispersed radiation; decrease of the light intensity applied to the channel including photo detector 8, amplifier 11 and threshold switch 13 would be so slight that the threshold switch 13 would not respond, that is, not provide a signal to enable the AND-gate 14 which then could cause an alarm signal. A fire sensor which is exceptionally sensitive to radiation in which absorption bands of combustion gases are present thus provides an apparatus which is particularly immune to false alarms.

The light source itself may specifically deliver radiation which falls within the spectral range in which the high absorption bands are present; alternatively, a broad band light source may be used, with suitable spectral filters. This permits adjustment of the spectral range of the radiation directed to photo element 8 within those specific spectral bands where high absorption is present, if combustion gases are introduced into the measuring chamber. Some loss in radiated intensity, that is energy, must be compensated for, however. Utilizing an LED, or a laser diode, one employs the directional characteristic thereof to advantage. Suitable construction of the measuring chamber, and the auxiliary chambers permits efficient utilization of radiation derived therefrom.

Various types of semiconductor light emitting elements can be used. Gallium arsenide diodes have characteristic wave lengths of about 830 to 850 nm. A particularly advantageous device is a three-element laser diode, a so-called tri-metal laser diode, for example diode, having the composition $(Pb_{1-x}Sn_x)$ Te and $(Pb_{1-x}Sn_x)$ Se, generating radiation in the wave length between 0.8 and 15 $\mu$. The characteristic absorption bands of carbon monoxide as well as carbon dioxide are in this range, that is, CO at 4.7 $\mu$ and $CO_2$ at 1.46, 1.60 or 4.27 $\mu$. Other suitable laser diodes have, for example, the composition $Ga(As_x P_{1-x})$, $(Pb_{1-x}Sn_x)$ Se, and $(Cd_xHg_{1-x})$ Te. The wave length of the light derived from the lasers depends on the band distance of the basic material. Thus, the range of radiation can be adjusted by suitable selection of the mixing proportions. The current density, hydrostatic pressure, temperature and the like may also be used to provide for fine adjustment of the radiation wave length. Thus, a heterostructured diode can be caused to provide radiation at a characteristic wave length of CO (4.7 $\mu$) or $CO_2$ (4.27 $\mu$) at a predetermined temperature, pressure, and current density. Pb SSe is also suitable as a diode to provide radiation in the range of from 4 to 8.5 $\mu$. All the referred-to laser diodes operate at room temperature, and without additional cooling. Radiation is not necessarily in the infra-red range, but may also be in the visible or ultra-violet range, by selecting suitable radiation sources.

Photo elements 7, 8 are preferably so constructed that their maximum sensitivity is matched to the radiation emitted from source 4. When laser diodes as above referred to are used, photo diodes of special composition have been found to be particularly suitable, for example using triglycinsulfate or $(Cd_xHg_{1-x})$ Te, In Sb.

Various changes and modifications may be made within the scope of the inventive concept.

The amplifiers 10, 11, threshold circuits 12, 13 AND-gate 14, timing circuit 15, switching circuit 16 and alarm 17 as such may be conventional, for a circuit diagram reference is made to U.S. Pat. No. 3,716,717, assigned to the assignee of the present invention.

We claim:
1. Method to indicate presence of fire by testing an atmospheric sample comprising
   irradiating the sample with radiation by irradiating the sample by radiation in a spectral range in which the gaseous combustion products have absorption bands;
   sensing the spectral absorption characteristics of the irradiated sample to test for absorption within said bands and hence gaseous combustion products and deriving a gas analysis signal;
   sensing dispersion of irradiating radiation to test for dispersed particles in the atmospheric sample and delivering a particle signal;
   detecting coincidence of the gas analysis signal and the particle signal;
   and providing an output signal if and only if coincidence is detected.
2. Method according to claim 1, wherein the radiation is in a spectral range between 0.8 and 8.5 $\mu$.
3. Method according to claim 2, wherein the spectral range of the radiation includes the absorption bands of at least one of: carbon monoxide, carbon dioxide.
4. Method according to claim 1, further comprising the step of
   generating irradiating radiation from a single source;
   and delivering a portion of said radiation to irradiate the portion of the sample to carry out the dispersion sensing step and further directing another portion of said radiation to a portion of the sample to carry out the spectral absorption sensing step.
5. Method according to claim 4, wherein the step of generating irradiating radiation comprises the step of generating radiation in the spectral range between 0.8 and 8.5 $\mu$.
6. Method according to claim 4, wherein the step of generating irradiating radiation from the single source comprises generating radiation primarily including the spectral range in which at least one of: carbon monoxide; and carbon dioxide, have absorption bands.
7. Fire sensor comprising means (1) defining a measuring chamber (2, 5, 6):
   a radiation source (4) directing radiation into the measuring chamber;
   at least two photo-electric devices (7, 8), one photo-electric device (8) being located in the measuring chamber to receive direct radiation from said source (4) and being primarily sensitive to radiation in a spectral range in which the absorption bands of gaseous combustion products are present whereby, upon introduction of atmosphere containing combustion products, output from said photo-electric device will decrease due to absorption of gaseous combustion products in the spectral range,
   the other photo-electric device (7) being outside the path of direct radiation from said source, whereby radiation to said other device will increase due to dispersion of light from the source due to presence of particulate matter in the measuring chamber;
   and an electrical circuit, including a coincidence circuit (11), providing an output signal if and only if the directly irradiated photo-electric device (8) indicates decrease in radiation due to absorption of radiation and, simultaneously, the other photo-electric device (7) indicates an increase in radiation applied thereto due to dispersion of combustion products and hence dispersion of light derived from the source and applied to said second photoelectric device.

8. Sensor according to claim 7, wherein the source comprises a semiconductor laser diode.

9. Sensor according to claim 8, wherein a single source (4) is provided, directing radiation into said chamber and directly irradiating said first photo-electric device (8), and providing indirect radiation, upon presence of particulate matter in said chamber, to said second photo-electric device (7).

10. Sensor according to claim 9, wherein said source comprises a semiconductor laser diode.

11. Sensor according to claim 10, wherein said semiconductor laser diode is a three-element laser diode.

12. Sensor according to claim 11, wherein said laser diode comprises Ga As P, Pb Sn Se, Cd Hg Te, Pb Sn Te, Pb Sn Se or Pb S Se.

13. Sensor according to claim 7, wherein said radiation source comprises a source directing radiation to the first photo-electric device (8) and a source directing radiation towards the second photo-electric device (7).

14. Sensor according to claim 7, wherein the photo-electric device (8) receiving direct radiation comprises a photo-electric transducer including tryglicinsulfate.

15. Sensor according to claim 7, wherein the photo-electric device (8) receiving direct radiation comprises a three-element photo diode including Cd, Hg, Te.

16. Sensor according to claim 7, wherein the electrical circuit comprises an AND-gate (14), the inputs of which are controlled by said photo-electric devices (7, 8).

17. Sensor according to claim 7, further comprising two threshold detectors (12, 13), one each connected to one of the photo-electric devices (7, 8), the threshold detector connected to the directly irradiated photo-electric device (8) providing an output signal when the output from said photoelectric device (8) indicates a drop below a predetermined irradiation threshold level;

and the threshold detector (12) connected to the other photo-electric device (7) responsive to dispersion, providing an output signal when the dispersed light impinging on said second photo-electric device (7) exceeds a predetermined level;

and wherein said electrical coincidence circuit comprises an AND-gate (14) controlled from the outputs of said threshold detectors.

18. Sensor according to claim 7, wherein the electrical circuit further comprises a timing circuit (16), said timing circuit being connected to the coincidence circuit (11) and to an alarm circuit and providing a time-delayed output to control the alarm circuit to provide an alarm signal if and only if a simultaneous increase in signal from said indirectly irradiated photo-electric device (7) and a decrease of irradiation of said directly irradiated photo-electric device (8) exceeds a predetermined time period as determined by said timing circuit (16).

* * * * *